Patented Jan. 5, 1937

2,066,895

UNITED STATES PATENT OFFICE 2,066,895

WATER-SOLUBLE SEED DISINFECTANT

Karl Memminger, Magdeburg-Sudost, Germany, assignor to Fahlberg-List Aktiengesellschaft Chemische Fabriken, Magdeburg-Sudost, Germany, a firm of Germany No Drawing. Application January 19, 1934, Serial No. 707,340. In Germany March 31, 1932

4 Claims. (Cl. 167—38)

The invention relates to a water-soluble seed disinfectant for the destruction of noxious agents, such as bacteria and the like, containing a phenol mercuricyanide as an active constituent.

The complex phenol mercuricyanides, particularly the cresol mercuricyanides, which are used as seed disinfectants, are of themselves insoluble. In order to convert them into a soluble form it has been proposed to dissolve the substance in alkali and evaporate the solution; also to mix the substance with caustic alkali or alkali phenolate. Such mixtures, however, always involve a decomposition. In the first case the decomposition occurs during the evaporation even when the substance has been dissolved in alkali lye as concentrated as possible. In the case of mixtures with caustic alkali, even after only a short time, a distinct coloration sets in which increases with time, so that the product is finally grey. This means a separation of mercury. In the case when sodium phenolate is used, the trouble is that this is decomposed by carbon dioxide, even in the cold. Further, it has been found that cresol mercuricyanide is only partially dissolved by phenol with separation of mercury. The mercuricyanides, therefore, are not stable in the presence of phenol. Since, as already stated, phenol is liberated from sodium phenol by carbon dioxide, mixtures containing cresol mercuricyanide suffer a gradual decomposition of the latter.

In consequence of the secondary phenomena described above, the fungicides decrease in their activity.

According to this invention, it is possible to make seed disinfectants or agents for steeping grain, which are soluble in water, from phenol mercuricyanides without incurring decomposition. For this purpose an insoluble phenol mercuricyanide in dry condition, obtained in a pure state in known manner, is mixed with dry trialkali-phosphate, for instance trisodiumphosphate or tripotassiumphosphate. Such a mixture dissolves freely in the necessary proportion of water without suffering any decomposition, and the product has a fungicidal action essentially higher than that of the known preparations, and, indeed, far higher than corresponds with the substitution of the pure complex compound for the impurities. The phosphate used herein acts as an intermediate solvent and is thus a type of preservative vehicle for the erstwhile insoluble phenol mercuricyanide in the presence of water, which latter is the ultimate solvent. Such a seed disinfectant according to the invention when used as a preventive of rust (Ustilago tritici or Tilletia tritici) and containing 4 per cent. of mercury has an effect equal to that of known seed disinfectants containing about 17 per cent. of mercury.

The mixture should preferably contain 3 molecular proportions of trialkaliphosphate to 1 molecular proportion of the mercury compound; i. e. more than 2,9 molecular proportions of trialkaliphosphate to 1 molecular proportion of the mercuricompound are to be used, but it is preferable to use an excess of trialkaliphosphate as a matter of safety or as a means for securing a quick dissolving of the seed disinfectant in water.

In order that the effective substance should be uniformly distributed in the new products, it is desirable to mix the finely pulverized mercury compound with an organic body in order to increase the original small volume of the cresol mercuricyanide compound. By this preliminary mixing, the mercury compound is fitted for intimate intermixture with the trisodiumphosphate. The added substance should preferably have approximately the same size of grain as the mercury compound has; it must be thoroughly soluble in water, indifferent towards mercury compounds and non-hygroscopic; finally, it must not have an acid reaction. A suitable substance to use as this diluent is alkali-para-toluenesulphonate or dextrin.

Sulphonic acids of another kind are known as additions to agents for steeping grain which do not contain mercury or contain insufficient mercury for the fungicidal purpose. The object of adding the said sulphonic acids has been the enhancement of the activity or for promoting wetting. On the other hand, the addition made in accordance with this invention is for increasing the solubility; moreover, as already indicated, both the composition of the seed disinfectant itself and also the chemical nature of the addition are different from previous knowledge.

It is usual in the case of seed disinfectants, and even in the case of the agent of this invention it is frequently advantageous, to add to the mixture a diluent for the purpose of increasing the bulk of the agent and thereby making it possible to adjust the content of mercury as may be desired. As diluents there may be used, wholly or in part, such substances as have been described above for admixing. As new diluents which may be used there may be named such organic or inorganic substances soluble in water which are indifferent to the mercury compound and are neither hygroscopic nor acid, such as, for example, sodium chloride or sodium sulphate. Trialkaliphosphate makes a good diluent, that is to say the amount of this substance mixed with the mercury compound for the purpose of producing solubility in water may be multiplied so as to obtain the desired degree of dilution of the mercury compound.

The new mixtures are indefinitely permanent.

The following examples illustrate the invention, the parts being by weight:—

*Example 1*

1 part of pure dry cresol mercuricyanide is mixed with about 2 parts of trisodiumphosphate ($Na_3PO_4+1H_2O$) and about 1–2 parts of sodium para-toluenesulphonate. The mixture is adjusted to the desired mercury content by means of a diluent soluble in water, such as sodium chloride.

*Example 2*

1 part of pure dry cresol mercuricyanide is mixed with 1–2 parts of dextrin, 10 parts of tripotassiumphosphate and so much sodium sulphate or sodium chloride as is necessary to adjust the mercury content to that desired.

*Example 3*

1 part of pure dry phenol mercuricyanide is mixed with 1–2 parts of dextrin and 1–2 parts of sodium para-toluene-sulphonate; 10 parts of calcined trisodiumphosphate are added and the mixture is adjusted, by the addition of further calcined trisodiumphosphate, so that it may contain the desired proportion of mercury.

I claim:—

1. A non-decomposing water-soluble disinfectant for wet treatment of seed, comprising an insoluble cresol mercuricyanide and trisodiumphosphate forming an intermediate solvent and preservative vehicle for the mercuricyanide in the presence of water.

2. A non-decomposing water-soluble disinfectant for wet treatment of seed comprising an insoluble cresol mercuricyanide, trisodiumphosphate forming an intermediate solvent and preservative vehicle for the mercuricyanide in the presence of water, and means cooperating with said trialkaliphosphate and enhancing its office as a vehicle, comprising an alkali-para-toluenesulphonate.

3. A non-decomposing seed disinfectant comprising a water soluble initially dry mixture of an insoluble phenol mercuricyanide with an alkaline substance in the form of trialkaliphosphate rendering said insoluble phenol mercuricyanide soluble in water.

4. A seed disinfectant according to claim 3, wherein the initial mixture includes a solution promoter in the form of alkali-para-toluenesulphonate.

KARL MEMMINGER.